April 24, 1951 L. HECKATHORN ET AL 2,550,475
IMPLEMENT CONSTRUCTION
Filed Sept. 27, 1946

INVENTORS
HOWARD B. RAPP
LOYD HECKATHORN
BY
*Carlson Pitzner Hubbard + Wolfe*
ATTORNEYS Patented Apr. 24, 1951

2,550,475

UNITED STATES PATENT OFFICE 2,550,475

IMPLEMENT CONSTRUCTION

Loyd Heckathorn, Garden Grove, and Howard B. Rapp, Santa Ana, Calif., assignors to Howard B. Rapp, Jessica M. Rapp, George A. Sattler, Marie A. Sattler, Basil R. Twsit, Mifflin K. Thomas, and Howard B. Rapp, Jr., copartners, doing business as Towner Manufacturing Company, Santa Ana, Calif.

Application September 27, 1946, Serial No. 699,748

8 Claims. (Cl. 308—19)

The present invention pertains to the construction of groundworking implements and more particularly to a lubricated bearing for use in a disc harrow or the like.

An object of the present invention is to provide a groundworking implement incorporating a novel and improved bearing construction which enables extended trouble-free operation in spite of use under the adverse conditions normally encountered where an implement bearing must operate in close proximity to loose soil.

Another object of the present invention is to provide an improved bearing for a groundworking implement which may be fabricated for the most part from standard rods, sleeves and the like, requiring a minimum of close tolerance machine work and which may be easily and quickly assembled and readily repaired. It is a correlative object to provide a bearing which may be produced in quantity at a greatly reduced cost of material and expenditure of man hours as compared to similar prior art bearings.

It is a further object to provide an improved bearing structure for a groundworking implement such as a disc harrow which includes both a sleeve bearing surface and a thrust bearing surface together with a lubricant reservoir and conducting channels so arranged that the bearing surfaces are constantly bathed with lubricant, the structure at the same time being well adapted to the use of a simple type of seal to prevent loss of the lubricant outside the bearing housing.

In one of its aspects it is an object of the invention to provide a bearing of the above type in which the housing is constructed in a manner which enables a portion of the bearing associated therewith to be readily removed for purposes of replacement or repair.

Other objects and advantages of the invention will become apparent as the following description proceeds taken in connection with the accompanying drawings in which.

While the invention is susceptible of various modifications and alternative constructions, we have shown in detail and will herein describe the preferred embodiments only, but it is to be understood that we do not thereby intend to limit the invention to the specific forms disclosed but intend to cover all modifications and alternative constructions falling within the spirit and scope of the invention as expressed in the appended claims.

In disc harrows of the usual type the bearings are a source of continual trouble, due primarily to the large axial thrust originating in the discs which must be transmitted through the bearing to the implement frame. A further difficulty arises from the fact that such implements must be operated in close proximity to loose soil, even a small amount of which between the bearing surfaces may cause such surfaces to be abraded and quickly destroyed. Many attempts have been made to solve the problem, but elaborate bearing assemblies involving the use of a large number of machined parts are out of the question since agricultural implements must be manufactured to sell at a low competitive price.

As an example of a prior art bearing arrangement, reference is made to U. S. Letters Patent No. 2,380,594 which was issued to one of the present applicants on July 31, 1945. This patent discloses a harrow structure including bearing surfaces which are adapted to carry large thrust forces and to operate successfully under the most adverse conditions, one of the primary features of the disclosed construction being the lubricating arrangement which causes the bearing surfaces to be constantly bathed with lubricant supplied from a reservoir. The implement to be described is of the same general type as disclosed in the patent referred to and possesses many of the same advantages, although it is of a considerably simplified and less expensive construction including component parts which may be more readily fabricated and assembled.

Figure 1:
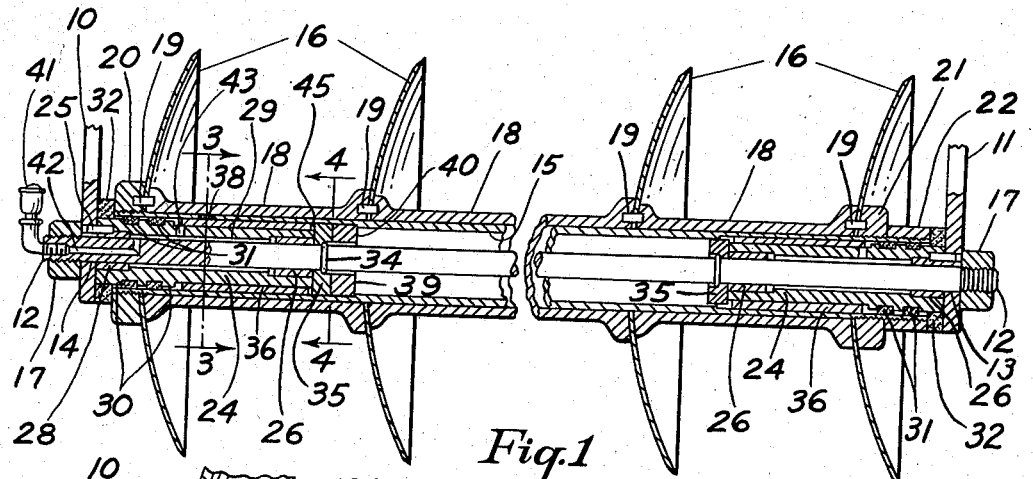
Figure 1 is a fragmentary sectional view of a disc harrow incorporating a bearing constructed in accordance with the invention.

Turning now to Fig. 1 of the drawings, the numerals 10, 11 indicate the side frame members respectively of a disc harrow frame which may, for example, be of the type shown in greater detail in the above mentioned prior patent. These side frame members carry a solid nonrotatable axle 12 extending between them and preferably passing through apertures 13, 14, being maintained in position by axle nuts 17. Coaxially surrounding the axle 12 is a rotatable tubular housing 15 which serves as a tool-supporting sleeve. The groundengaging tool mounted on the sleeve 15 in the present instance consists of a series of harrow discs 16 which are spaced from one another by means of tubular spacers 18, the discs and spacers being prevented from relative rotation by the alining dowel pins 19. Threaded retaining collars 20, 21, and a lock nut 22 engage the threaded ends respectively of the tool-supporting sleeve 15, so that the supporting sleeve, the spacers 18 and the discs 16 form a rigid but rotatable unitary structure.

While harrow discs have been shown in the exemplary embodiment, it will be understood that the use of such discs per se forms no part of the present invention and that other types of groundworking tools rotatable on a horizontal axis may be mounted on the tool-supporting sleeve 15.

In accordance with the invention a novel and improved bearing structure is utilized to enable relative rotation of the tool-supporting sleeve 15 with respect to the axle 12, such structure lying in the annular space between the members. The bearing includes sleeve members to take up the radial loading and thrust collars to resist the large axial forces which must be transmitted from the groundworking tool, in this case the disc harrow, to one of the side frame members. Radial loading is borne by an inner bearing sleeve 24 which is telescoped over the end of the axle 12. Relative rotation between the inner bearing sleeve and either the frame or axle is prevented by a locking dowel pin 25 which projects into both the inner bearing sleeve 24 and the side frame member 10. Inserted between the inner bearing sleeve and the axle 12 are supporting collars 26, 28 which extend inwardly only a short distance from the ends of the bearing sleeve and define the ends of an annular recess or relieved portion 29 within the sleeve, the purpose of which will later appear. Extending radially near the outer end of the bearing sleeve 24 are annular flanges 30 which are dimensioned to clear the inner surface of the tool-supporting sleeve 15 by a small amount. Packing material 31, preferably of oil resistant fibrous material, is arranged between the flanges; this, together with packing material 32 at the end of the sleeve 15, serves to prevent leakage of lubricant from within the tool-supporting sleeve.

In accordance with one aspect of the invention improved means are provided for maintaining the inner bearing sleeve axially clamped to the side frame member 10 and axially fixed with respect to the axle 12. In the present instance this is accomplished by providing a snap ring 34 which is mounted in a cooperating annular groove 33 machined into the axle 12. The snap ring 34 may be of the conventional C-shaped type of a normal diameter which is slightly smaller than the root of the annular groove. Lying adjacent the snap ring 34 and separating the latter from the inwardly presented end of the inner bearing sleeve 24, is a holding or thrust collar 35. Thus as the axle is forcibly drawn to the left by increasing engagement of the left-hand nut 17, the snap ring 34 serves to clamp the collar 35 and the inner bearing sleeve 24 into firm engagement with the side frame member 19.

Telescoped over the inner sleeve 24 and mounted on the inside surface of the tool-supporting sleeve 15 is an outer bearing sleeve 36. The latter may be fixed in position within the tool-supporting sleeve by any desired means. However, we prefer to weld the members together by a "flow weld" 38 which involves the forming of a puddle of weld metal in an aperture provided in the wall of the tool-supporting sleeve.

In order to resist the axial thrust forces, a thrust collar 39 is mounted within the tool-supporting sleeve 15 in a position to engage the holding or thrust collar 35 in face-to-face relationship. The thrust collar 39 is received in close fitting engagement with the tool-supporting sleeve 15 and seated on an annular shoulder 40 therein. Preferably, the annular collar 39 is radially slotted and slightly oversize in diameter so that upon being forced into the tool-supporting sleeve, it tends to maintain its position. It will be apparent that with the annular shoulder 40 within the tool-supporting sleeve and faced in the direction illustrated, the collars 35, 39 are in position to resist thrust which is directed to the left as viewed in Fig. 1, and it will be assumed that the harrow discs 16 or equivalent groundworking members will be so arranged as to always produce thrust in this direction. Tracing the path through which thrust is applied to the side frame member 10, it will be found that the force exerted by the thrust collar 40 is taken up by the cooperating thrust collar 35 and is axially exerted through the inner bearing sleeve 24 to the side frame member. Thus it is seen that in the improved bearing construction the inner bearing sleeve is utilized to resist both radial and axial pressures.

Figure 3:
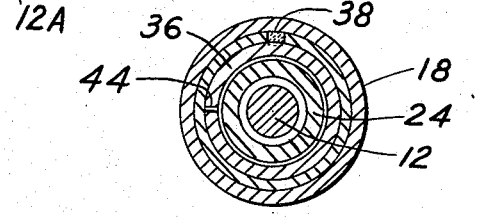
Fig. 3 is a transverse sectional view taken along line 3—3 of Fig. 1.
Figure 4:
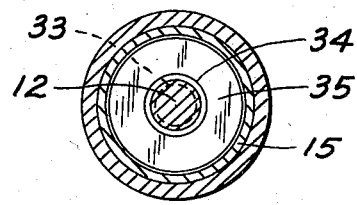
Fig. 4 is a transverse sectional view taken along the line 4—4 of Fig. 1.

The present invention is also concerned with the lubrication of the radial and thrust bearing surfaces in such a manner that the surfaces are continually bathed with lubricant and friction reduced to a minimum. A constant supply of lubricant has been found to be particularly effective in keeping the surfaces free of dirt or other foreign material which may for any reason be lodged between them. This is accomplished in the present instance by providing an externally mounted reservoir 41 which empties into an oil channel 42 in the axle. Such oil channel includes both an initial portion extending inwardly within the axle 12 and a final portion at an angle thereto which terminates in the recess 29 within the inner bearing sleeve. The inner bearing sleeve is perforated, for example as shown at 43 to enable the lubricant contained within the recess 29 to be applied directly to the radial bearing surfaces. Transfer of the oil axially along the bearing surface is facilitated by a longitudinal slit 44 in the outer bearing sleeve 36 (see Fig. 3) which serves as an oil-conducting path.

Upon inspection of Fig. 1 it will be seen that the outer bearing sleeve 36 is of lesser axial extent than the cooperating inner sleeve and defines an annular space 45 at the inner end of the radial bearing. This enables lubricant from the radial bearing to flow to the thrust bearing surface between the collars 35, 39, the lubricant readily passing around collar 35 because of the clearance between it and the tool-supporting sleeve. Any excess of lubricant leaving the thrust bearing surfaces is free to travel along the inner surface of the tool-supporting sleeve to the bearing assembly at the other end of the axle.

It will be noted that the reservoir 41 extends upwardly a short distance above the level of the bearing surfaces. This provides sufficient pressure head so that the oil is positively forced into the restricted confines of the channel 42, the recess 29, and through one or more perforations 43 directly into contact with the bearing surfaces. When the tool is put into operation, a plentiful supply of lubricant is supplied to the reservoir 41 in order to insure that the bearing surfaces at both ends of the axle are adequately bathed in oil, and further to insure that an excess of oil is contained within the central portion of the tool-supporting sleeve. If desired, an additional reservoir and channel may be used at the opposite end of the axle although in practice it has been found that admission of lubricant at one end only produce adequate lubrication of all the bearing surfaces contained within the tool-supporting sleeve. The effective arrangement of the packing 31, 32 as disclosed prevents the escape of oil both during operation of the implement and during extended periods of storage.

Attention is drawn to the fact that the component parts of the bearing and bearing supporting structure are extremely simple and inexpensive to fabricate and in addition enable the entire assembly to be constructed with a minimum expenditure of man hours. The inner bearing sleeve, for example, is smoothly cylindrical in shape except for the radial flanges 30 used for maintaining the packing material in place. The outer bearing sleeve 36 is likewise a simple cylinder and the collars 35, 39 require a minimum of machining. Furthermore, it is to be noted that the axle 12 may be constructed of standard solid bar stock, carrying no mechanical stops or shoulders thereon except as provided by the snap ring 34.

The improved bearing has been described above only in connection with the left-hand end of the implement as illustrated in Fig. 1. It will be understood, however, that the bearing structure used at the right-hand end thereof utilizes the same basic components although it is somewhat simplified since no means are included for absorbing axial thrust or for supplying lubricant directly to the bearing surfaces. Since like numerals are employed to indicate like parts, it will not be necessary to discuss the right-hand bearing assembly in any further detail.

*Modified construction*

Figure 2:
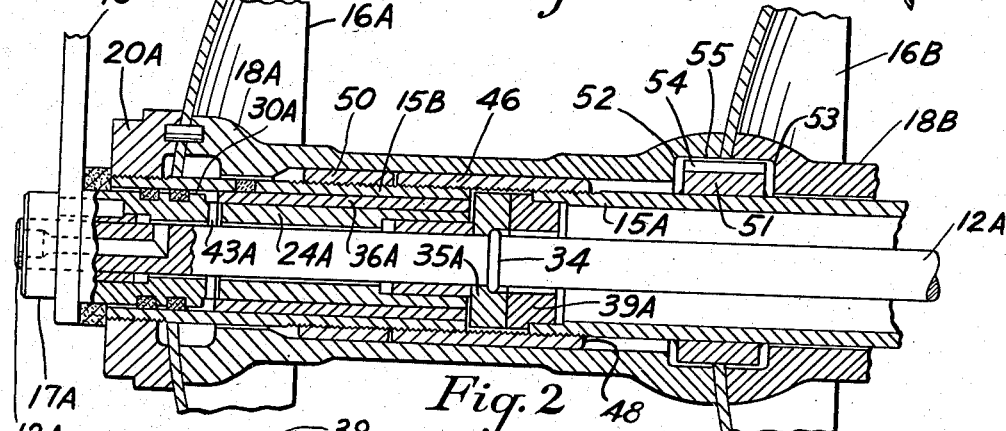
Fig. 2 is an enlarged fragmentary section of a modified form of bearing construction embodying the invention.

Because of the effectiveness of the lubricating and sealing means and the improved arrangement of the bearing surfaces, it has been found in practice that such surfaces are subjected to very little wear even over extended periods of time. Under some circumstances, however, it may be felt desirable to completely disassemble the bearing for purposes of inspection or repair. Such disassembly is facilitated by the structure illustrated in the enlarged fragmentary view of Fig. 2, like parts being indicated by like numerals carrying the subscript "a." There it will be seen that the tool-supporting sleeve consists of a main section 15a and a relatively short end section 15b. These sections are normally maintained rigid with one another and the function of the sleeve 15a, 15b is exactly the same as that discussed in connection with the sleeve 15 of Fig. 1. In accordance with one aspect of the invention, however, means are provided for manually disengaging the end section 15b from the main section 15a, the latter in the present instance being accomplished by a threaded sleeve 46. This sleeve is preferably welded to the main section as at 48, enabling the end section 15b to be threadedly advanced therein to the position shown and locked in place by means of a threaded locking sleeve 50.

Surrounding the threaded joint and located between the end discs 16a, 16b on the tool-supporting sleeve is a special spacer 18a which is bored out sufficiently to receive the threaded sleeves 46, 50. As in the previous embodiment the harrow discs and the spacers are retained against outward movement by a locking collar which is here designated 20a and preferably has a tapered or pipe thread.

In the practice of the invention additional means are provided for maintaining those spacers located to the right of the spacer 18a assembled on the supporting sleeve 15a even after the bearing has been completely disassembled. In the embodiment illustrated the latter is accomplished by an auxiliary retaining collar 51 which is alined with the second disc 16b and which is firmly secured against axial displacement, for example by welding to the sleeve 15a. This retaining collar is received within hollowed out end portions 52, 53 of adjacent spacers 18a, 18b. The retaining collar also includes a raised rib 54 along one side thereof which registers with corresponding notches indicated generally at 55 in the spacers 18a, 18b, and in the central portion of the disc 16b. The auxiliary retaining collar therefore serves two functions: Not only does it prevent the major portion of harrow discs and spacers from being dislodged from the tool-supporting sleeve 15a when the bearing is disassembled, but it also serves, similarly to the dowel pins 19 of Fig. 1, to prevent relative rotation between the tool-supporting sleeve and the tool members mounted thereon.

Although it will be apparent from the foregoing description, it will be helpful to briefly outline the procedure employed in disassembling the bearing. It will be assumed at the outset that the axle 12a and the parts mounted thereon have been removed from the implement frame, the latter requiring the removal of the nuts 17a. The threaded retaining collar 20a is next removed, after which the disc 16a and the spacer 18a may be slid from the end of the tool-supporting sleeve 15b. This exposes the threaded sleeves 46, 50 enabling the locking sleeve 50 to be loosened. The end portion 15b of the tool-supporting sleeve may then be unscrewed. Since there is axial interference between the outer sleeve 36a and the radial flanges at the end of the inner sleeve, such unscrewing will cause both the outer and inner bearing sleeves to be disengaged and available for servicing or replacement. It will be apparent from the drawing that this enables the thrust collars 35a, 39a also to be withdrawn. Reassembly may, of course, be effected in the reverse sequence.

We claim as our invention:

1. In a groundworking implement having a side frame member, the combination comprising a nonrotatable axle in said side member, a rotatable tool-supporting sleeve coaxial with said axle but radially spaced therefrom, an inner bearing sleeve on said axle at one end thereof, an outer bearing sleeve telescoped over said inner sleeve and mounted rigidly inside said tool-supporting sleeve, a first thrust collar abuttingly mounted adjacent said inner bearing sleeve at the inwardly projecting end of the latter, a second thrust collar in flat sliding engagement with said first thrust collar and adapted to rotate with said tool supporting sleeve, means locking said second thrust collar in thrust transmitting engagement with said tool-supporting sleeve so that thrust in the latter in a direction toward the bearing assembly is transmitted serially through said second thrust collar, said first thrust collar, said inner bearing sleeve and thence to said axle.

2. In a groundworking implement the combination comprising a side frame member having an aperture therein, an axle extending through said aperture to support said side frame, an inner bearing sleeve surrounding said axle and presenting a radially directed bearing surface, a thrust collar on said axle and lying adjacent said inner bearing sleeve at the end thereof which projects inwardly away from said side frame, a stop on said axle for positioning said thrust collar on said axle and to limit the inward movement of said collar, means threadedly engaging the end of the axle to draw the latter outward so that said stop, said collar, and said sleeve are drawn into intimate engagement and made rigid with said frame, a tool-supporting sleeve telescoped over said axle and surrounding the same, said tool-supporting sleeve having a second bearing sleeve and a second thrust collar mounted therein and positioned to engage said first mentioned bearing sleeve and thrust collar respectively to the end that the bearing sleeve on said axle in addition to resisting the radial load of said tool-supporting sleeve serves during operation of the implement to transmit the thrust of said tool-supporting sleeve to said side frame.

3. In a groundworking implement the combination comprising a side frame member having an aperture therein, an axle extending through said aperature for supporting said side frame, an inner bearing sleeve surrounding said axle near one end thereof and presenting a radially directed bearing surface, a thrust collar on said axle and lying adjacent the inwardly projecting end of said inner bearing sleeve, an annular groove in said axle adjacent the inner side of said thrust collar, a C-shaped snap ring in said groove for positioning said thrust collar on said axle and to limit the inward movement of said collar, and means forcing said side frame, said sleeve, and said thrust collar against said snap ring in intimate engagement, a tool-supporting sleeve telescoped over said axle and surrounding the same, said tool-supporting sleeve having bearing surfaces mounted rigidly therein and positioned to respectively engage said bearing sleeve and said thrust collar.

4. In a groundworking implement having a side frame member, the combination comprising a nonrotatable axle of solid bar stock having an end in supporting engagement with said side frame, a rotatable tool-supporting sleeve coaxially surrounding said axle but providing space for bearing sleeves therein, an inner bearing sleeve carried by said axle near the end thereof, an outer bearing sleeve fixed to the inner surface of said tool-supporting sleeve and telescoped over said inner bearing sleeve, said inner bearing sleeve being relieved internally to define an annular chamber immediately surrounding said axle, said axle incorporating an oil channel having an inlet at the end of said axle and terminating within said annular chamber, an oil reservoir connected to said inlet arranged to provide oil under sufficient head to force its way into said annular chamber, said inner bearing sleeve having perforations therethrough for supplying oil from said chamber to the bearing surfaces, and packing means for preventing leakage of oil from said tool-supporting sleeve.

5. In a groundworking implement having a side frame member, the combination comprising a nonrotatable axle having its end in supporting engagement with said side frame, a rotatable tool-supporting sleeve coaxially surrounding said axle but spaced therefrom to provide room for bearing sleeves, an inner bearing sleeve mounted on said axle, a thrust collar on said axle rigidly abutting the inwardly projecting end of said inner bearing sleeve, an outer bearing sleeve fixed to said rotatable tool-supporting sleeve and telescoped over said inner bearing sleeve, a thrust collar thrustingly engaged by the inner surface of said tool-supporting sleeve and adapted for face-to-face sliding engagement with said first mentioned thrust collar, means defining a channel to feed oil between the telescoped faces of said bearing sleeves, said outer bearing sleeve being of lesser axial extent than said inner bearing sleeve thereby to define an annular space for the passage of oil from the sleeve bearing surface to the thrust bearing surface.

6. In a groundworking implement the combination comprising a side frame member carrying a nonrotatable axle in supporting engagement, a tool-supporting sleeve coaxially surrounding said axle but defining an annular space therebetween for bearing sleeves, an inner bearing sleeve mounted rigidly on said axle at one end thereof, an outer bearing sleeve telescoped over said inner bearing sleeve, said tool-supporting sleeve including a main section and a short manually separable end section, said outer bearing sleeve being firmly attached within said short end section, the separability of said short end section enabling said outer bearing sleeve to be removed from said implement for the purpose of remachining or replacing the bearing material contained therein.

7. In a groundworking implement the combination comprising a side frame member, a nonrotatable axle supportingly engaging said side frame, a tool-supporting sleeve coaxially surrounding said axle but larger in diameter so as to define an annular space therein for bearing sleeves, an inner bearing sleeve mounted rigidly on said axle near one end thereof, an outer bearing sleeve telescoped over said inner bearing sleeve and constructed to be separated therefrom by an oil film, said tool-supporting sleeve comprising a main section and a relatively shorter end section, means including a threaded collar for keeping said sections in normal abutting engagement, said outer bearing sleeve being welded within the short end portion of said tool-supporting sleeve, disengagement of the threaded collar enabling said end section to be removed for replacement of said outer bearing sleeve.

8. In a groundworking implement the combination comprising a side frame member, a nonrotatable axle in supporting engagement therewith, a tool-supporting sleeve coaxially surrounding said axle but spaced therefrom to define an annular chamber for bearing sleeves, an inner bearing sleeve closely surrounding said axle at a point adjacent said side frame, an outer bearing sleeve slidingly telescoped over said inner bearing sleeve, said tool-supporting sleeve including a main section and a shorter end section disengageably attached thereto, said outer bearing sleeve being firmly attached to said end section of the tool-supporting sleeve, tool means telescoped over said tool-supporting sleeve, and means permanently attached to the main section of said tool-supporting sleeve for preventing said tool means from being removed from the main portion of said tool-supporting sleeve upon the removal of the end portion thereof for bearing replacement purposes.

LOYD HECKATHORN.
HOWARD B. RAPP.

REFERENCES CITED

The following references are of record in the file of this patent:

UNITED STATES PATENTS

| Number | Name | Date |
| --- | --- | --- |
| 1,152,061 | Teeters | Aug. 31, 1915 |
| 2,380,594 | Heckathorn | July 31, 1945 |